United States Patent Office 3,518,267
Patented June 30, 1970

3,518,267
1-AMINOALKYL AND 1-HYDROXYALKYL-TETRA-HYDRO-HALO-SULFAMYL-QUINAZOLINONE
Bola Vithal Shetty, Rochester, N.Y., assignor to Pennwalt Corporation, East Orange, N.J., a corporation of Pennsylvania
No Drawing. Filed Feb. 23, 1968, Ser. No. 707,411
Int. Cl. C07d 51/48
U.S. Cl. 260—256.5        11 Claims

ABSTRACT OF THE DISCLOSURE

A 1,2,3,4-tetrahydro-halo-sulfamyl-quinazolinone having diuretic properties, characterized by having in the 3-position a substituted or unsubstituted aryl or aralkyl group and by having in the 1-position an aminoalkyl, or hydroxyalkyl group.

The invention relates to diuretic quinazolinone compounds. More particularly, the invention relates to 1,2,3,4-tetrahydro-sulfamyl-quinazolinone compounds.

In accordance with this invention, 1,2,3,4-tetrahydrosulfamyl-quinazolinone compounds have, in the 3-position, a substituted or unsubstituted aryl or aralkyl group, and in the 1-position an aminoalkyl or hydroxyalkyl group. These compounds, like the compounds claimed in my application Ser. No. 517,995, now Pat. 3,360,518 which have a hydrogen or alkyl group in the 1-position, are effective diuretics.

The compounds of this invention are preferably of the following formula:

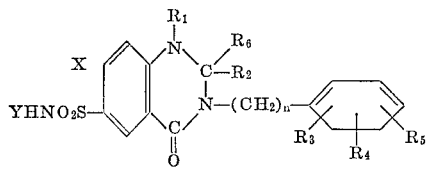

or the pharmaceutically acceptable salts thereof, in which X is halogen or trifluoromethyl; Y is hydrogen or loweralkyl; $R_1$ is aminoloweralkyl, mono or diloweralkyl substituted aminoloweralkyl, or hydroxyloweralkyl; $R_2$ is hydrogen, loweralkyl, loweralkoxy, loweralkoxyalkyl, loweralkenyl, loweralkynyl, lowercycloalkyl, lowercycloalkylloweralkyl, thioalkyl, including alkylthioalkyl and benzylthioalkyl, alkylthio, phenylthio, halogen substituted alkyl, phenylalkyl, substituted phenylalkyl or phenyl, especially where the phenyl substituent is hydroxy, loweralkoxy, loweralkyl, halogen, trifluoromethyl, sulfamyl, or amino; $R_3$ is hydrogen, loweralkyl, hydroxy, alkoxy, $NH_2$, $SO_2NH_2$, halogen or trifluoromethyl; $R_4$ and $R_5$ are any of $R_3$; $R_6$ is any of $R_2$, and $n$ is an integer from 0–4.

In the above formula X is preferably chlorine or trifluoromethyl, but bromine and the other halogens are not precluded. $R_1$ is preferably aminomethyl or hydroxymethyl. $R_2$ is preferably methyl or hydrogen. The thioalkyl, when used is preferably a thioloweralkyl; the halogen of the halogen substituted alkyl is preferably chlorine.

Loweralkyl and loweralkoxy means alkyl and alkoxy radicals of no more than 8 carbon atoms in a straight chain; lowercycloalkyl means a cycloalkyl of not more than 8 methylene groups in the ring. $R_3$, $R_4$, and $R_5$ may be any of the stated radicals in one or more of the ortho, meta or para positions. Preferably $R_3$ is methyl in the ortho position, also where sulfamyl is used it is preferably present in the meta or para position with methyl in the ortho position. The substituted phenyl of $R_2$ and the substituted aralkyl of $R_2$ are suitably substituted with hydroxy, alkoxy (preferably loweralkoxy), loweralkyl, halogen, $SO_2NH_2$, trifluoromethyl, and $NH_2$.

Specific suitable compounds of the above formula include 1-aminomethyl-2-methyl-3-o-tolyl-6-sulfamyl-7-chloro-1,2,3,4-tetrahydro-4-quinazolinone;
1-aminomethyl-2-methyl-3-o-tolyl-6-sulfamyl-7-trifluoromethyl-1,2,3,4-tetrahydro-4-quinazolinone;
1-methylaminomethyl-3-o-tolyl-6-sulfamyl-7-chloro-1,2,3,4-tetrahydro-4-quinazolinone;
1-hydroxymethyl-2-ethyl-3-o-tolyl-6-sulfamyl-7-trifluoromethyl-1,2,3,4-tetrahydro-4-quinazolinone;
1-aminomethyl-2-ethyl-3-o-tolyl-6-sulfamyl-7-chloro-1,2,3,4-tetrahydro-4-quinazolinone;
1-hydroxypropylmethyl-3-o-toyl-6-methylaminosulfonyl-7-chloro-1,2,3,4-tetrahydro-4-quinazolinone;
1-aminomethyl-2-methyl-3-(p-chlorophenyl)-6-sulfamyl-7-chloro-1,2,3,4-tetrahydro-4-quinazolinone;
1-hydroxyethyl-2-methyl-3-o-tolyl-6-methylaminosulfonyl-7-chloro-1,2,3,4-tetrahydro-4-quinazolinone;
1-aminomethyl-2-methyl-3-phenyl-6-sulfamyl-7-chloro-1,2,3,4-tetrahydro-4-quinazolinone;
1-aminomethyl-2-methyl-3-(2'-methyl-3'-chlorophenyl)-6-sulfamyl-7-chloro-1,2,3,4-tetrahydro-4-quinazolinone;
1-aminomethyl-2-methyl-3-(p-chlorophenyl)-6-methylaminosulfonyl-7-chloro-1,2,3,4-tetrahydro-4-quinazolinone;
1-aminomethyl-2-methyl-3-(2'-methylbenzyl)-6-sulfamyl-7-chloro-1,2,3,4-tetrahydro-4-quinazolinone;
1-aminomethyl-2-phenyl-3-o-tolyl-6-sulfamyl-7-chloro-1,2,3,4-tetrahydro-4-quinazolinone;
1-aminomethyl-2-propyl-3-o-tolyl-6-sulfamyl-7-chloro-1,2,3,4-tetrahydro-4-quinazolinone;
1-aminomethyl-2-butyl-3-o-tolyl-6-sulfamyl-7-chloro-1,2,3,4-tetrahydro-4-quinazolinone;
1-aminomethyl-2-propyl-3-o-tolyl-6-sulfamyl-7-trifluoromethyl-1,2,3,4-tetrahydro-4-quinazolinone;
1-aminomethyl-2-butyl-3-o-tolyl-6-sulfamyl-7-trifluoromethyl-1,2,3,4-tetrahydro-4-quinazolinone;
1-aminomethyl-2-bennzylthiomethyl-3-o-tolyl-6-sulfamyl-7-chloro-1,2,3,4-tetrahydro-4-quinazolinone;
1-aminomethyl-2-(2,2,2-trifluoroethylthiomethyl)-3-o-tolyl-6-sulfamy$l$-7-chloro-1,2,3,4-tetrahydro-4-quinazolinone;
1-aminomethyl-2-ethylthiomethyl-3-o-tolyl-6-sulfamyl-7-chloro-1,2,3,4-tetrahydro-4-quinazolinone;
1-aminomethyl-2-chloromethyl-3-o-tolyl-6-sulfamyl-7-chloro-1,2,3,4-tetrahydro-4-quinazolinone;
1-aminomethyl-2-dichloromethyl-3-o-tolyl-6-sulfamyl-7-chloro-1,2,3,4-tetrahydro-4-quinazolinone;
1-aminomethyl-2-trichloromethyl-3-o-tolyl-6-sulfamyl-7-chloro-1,2,3,4-tetrahydro-4-quinazolinone;
1-aminomethyl-2-benzyl-3-o-tolyl-6-sulfamyl-7-chloro-1,2,3,4-tetrahydro-4-quinazolinone;
1-aminomethyl-2-(3'-sulfamyl-4'-chlorophenyl)-3-o-tolyl-6-sulfamyl-7-chloro-1,2,3,4-tetrahydro-4-quinazolinone;
1-aminomethyl-2-(3'-sulfamyl-4'-chlorobenzyl)-3-o-tolyl-6-sulfamyl-7-chloro-1,2,3,4-tetrahydro-4-quinazolinone;
1-aminomethyl-2-methyl-3-(o-hydroxyphenyl)-6- sulfamyl-7-chloro-1,2,3,4-tetrahydro-4-quinazolinone;
1-aminomethyl-2-methyl-3-(o-methoxyphenyl)-6-sulfamyl-7-chloro-1,2,3,4-tetrahydro-4-quinazolinone;
1-aminomethyl-2-methyl-3-(p-aminophenyl)-6-sulfamyl-7-chloro-1,2,3,4-tetrahydro-4-quinazolinone;
1-aminomethyl-2-methyl-3-(2'-methyl-4'-aminophenyl)-6-sulfamyl-7-chloro-1,2,3,4-tetrahydro-4-quinazoline;
1-aminomethyl-2-methyl-3-(2'-methyl-3'-sulfamylphenyl)-6-sulfamyl-7-chloro-1,2,3,4-tetrahydro-4-quinazolinone;
1-hydroxypropyl-2-methyl-3-(2'-methyl-3'-sulfamylphenyl)-6-sulfamyl-7-trifluoromethyl-1,2,3,4-tetrahydro-4-quinazolinone;
1-aminomethyl-2-ethyl-3-(2'-methyl-3'-chlorophenyl)-6-sulfamyl-7-trifluoromethyl-1,2,3,4-tetrahydro-4-quinazolinone;
1-dimethylaminomethyl-2-methyl-3-(2'-methyl-3'-chlorophenyl)-6-methylaminosulfonyl-7-chloro-1,2,3,4-tetrahydro-4-quinazolinone;
1-aminomethyl-2-ethyl-3-(2'-sulfamylphenyl)-6-sulfamyl-7-chloro-1,2,3,4-tetrahydro-4-quinazolinone;
1-aminomethyl-2-cyclopentylmethyl-3-o-tolyl-6-sulfamyl-7-chloro-1,2,3,4-tetrahydro-4-quinazolinone;
1-hydroxymethyl-2-cyclobutyl-3-o-tolyl-6-sulfamyl-7-chloro-1,2,3,4-tetrahydro-4-quinazolinone;
1-aminomethyl-2-cyclobutyl-3-o-tolyl-6-sulfamyl-7-trifluoromethyl-1,2,3,4-tetrahydro-4-quinazolinone;
1-aminomethyl-2-cyclopropylmethyl-3-o-tolyl-6-sulfamyl-7-chloro-1,2,3,4-tetrahydro-4-quinazolinone;
1-aminomethyl-2-cyclopropyl-3-o-tolyl-6-sulfamyl-7-trifluoromethyl-1,2,3,4-tetrahydro-4-quinazolinone;
1-aminomethyl-2-methyl-3-benzyl-6-sulfamyl-7-chloro-1-diethylaminomethyl-2-cyclopentyl-3-o-tolyl-6-sulfamyl-7-chloro-1,2,3,4-tetrahydro-4-quinazolinone;
1-aminomethyl-2-2-dimethyl-3-o-tolyl-6-sulfamyl-7-chloro-1,2,3,4-tetrahydro-4-quinazolinone;
1,2,3,4-tetrahydro-4-quinazolinone;
1-aminomethyl-2-methyl-3-o-tolyl-6-sulfamyl-7-chloro-1,2,3,4-tetrahydro-4-quinazolinone;
1-aminomethyl-2-methyl-3-(2'-methyl-4'-chlorophenyl)-6-sulfamyl-7-chloro-1,2,3,4-tetrahydro-4-quinazolinone;
1-aminomethyl-2-cyclobutylmethyl-3-o-tolyl-6-sulfamyl-7-chloro-1,2,3,4-tetrahydro-4-quinazolinone;
1-aminomethyl-2-methyl-3-(2'-trifluoromethyl-4'-aminophenyl)-6-sulfamyl-7-chloro-1,2,3,4-tetrahydro-4-quinazolinone;
the sodium salt of 1-aminomethyl-2-methyl-3-o-tolyl-6-sulfamyl-7-chloro-1,2,3,4-tetrahydro-4-quinazolinone;
and the potassium salt of 1-hydroxymethyl-2-methyl-3-o-tolyl-6-sulfamyl-7-chloro-1,2,3,4-tetrahydro-4-quinazolinone;
1-aminomethyl-2-methoxy-3-o-tolyl-6-sulfamyl-7-chloro-1,2,3,4-tetrahydro-4-quinazolinone;
1-aminomethyl-2-alkyl-3-o-tolyl-6-sulfamyl-7-chloro-1,2,3,4-tetrahydro-4-quinazolinone,
and 1-aminomethyl-2-acetenyl-3-o-tolyl-6-sulfamyl-7-chloro-1,2,3,4-tetrahydro-4-quinazolinone.

The following Table I gives suitable diuretic compounds in tabular form:

Me=methyl
Et=ethyl
Ph=phenyl

TABLE I

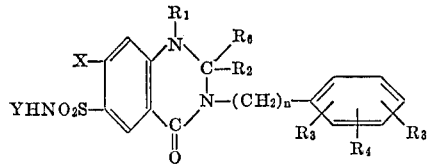

| $R_1$ | $R_2$ | $R_3$ | $R_4$ | $R_5$ | X | Y | n | $R_6$ |
|---|---|---|---|---|---|---|---|---|
| $NH_2CH_2$ | Me | 2-Me | H | H | Cl | H | 0 | H |
| $NH_2CH_2$ | Me | H | H | H | Cl | H | 0 | H |
| $NH_2CH_2$ | Me | 2-Me | 3-Me | H | Cl | H | 0 | H |
| $NH_2CH_2$ | Me | 2-Me | 4-Cl | H | Cl | H | 0 | H |
| $NH_2CH_2$ | Me | 2-Me | 4-OH | H | C. | H | 0 | H |
| $NH_2CH_2$ | Me | 2-Me | 4-$NH_2$ | H | Cl | H | 0 | H |
| $NH_2CH_2$ | Me | 2-Me | 3-Me | 4-Me | Cl | H | 0 | H |
| $NH_2CH_2$ | Me | 2-Me | H | H | F | H | 0 | H |
| $NH_2CH_2$ | Me | 2-Me | H | H | $CF_3$ | H | 0 | H |
| $NH_2CH_2$ | Me | 2-Me | H | H | Cl | Me | 0 | H |
| $NH_2CH_2$ | Me | 2-Me | H | H | Cl | Me | 1 | H |
| $NH_2CH_2$ | Me | 2-Me | H | H | Cl | Me | 2 | H |
| $NH_2CH_2$ | Me | 2-Me | H | H | Cl | Me | 3 | H |
| $NH_2CH_2$ | Et | 2-Me | H | H | Cl | H | 0 | H |
| $NH_2CH_2$ | Ph | 2-Me | H | H | Cl | H | 0 | H |
| $NH_2CH_2CH_2$ | Me | H | H | H | Cl | H | 0 | H |
| $NH_2CH_2CH_2$ | Me | 2-Me | H | H | Cl | H | 0 | H |
| $NH_2CH_2CH_2$ | Me | 2-Me | 4-Cl | H | Cl | H | 0 | H |
| $NH_2CH_2CH_2$ | Me | 2-Me | 4-OH | H | Cl | H | 0 | H |
| $NH_2CH_2CH_2$ | Me | 2-Me | 4-Me | H | Cl | H | 0 | H |
| $NH_2CH_2CH_2$ | Me | 2-Me | 4-$NH_2$ | H | Cl | H | 0 | H |
| $NH_2CH_2CH_2$ | Me | 2 Me | 3-Me | H | Cl | H | 0 | H |
| $NH_2CH_2CH_2$ | Me | 2-Me | H | H | Cl | Me | 0 | H |
| $NH_2CH_2CH_2$ | Me | 2-Me | H | H | $CF_3$ | H | 0 | H |
| $NH_2CH_2CH_2$ | Et | 2-Me | H | H | Cl | H | 0 | H |
| $CH_2OH$ | Me | 2-Me | H | H | Cl | H | 0 | H |
| $CH_2CH_2OH$ | Me | 2-Me | H | H | Cl | H | 0 | H |
| $CH_2CH_2N\begin{smallmatrix}CH_3\\CH_3\end{smallmatrix}$ | Me | 2-Me | H | H | Cl | H | 0 | H |
| $CH_2NHMe$ | Me | 2-Me | H | H | Cl | H | 0 | H |
| $CH_2NMe_2$ | Me | 2-Me | H | H | Cl | H | 0 | H |
| $CH_2CH_2NH_2$ | Me | 2-Me | H | H | Cl | H | 0 | H |
| $CH_2CH_2CH_2NH_2$ | Me | 2-Me | H | H | Cl | H | 0 | H |
| $CH_2NMe_2$ | Me | 2-Me | H | H | Cl | H | 0 | H |
| $CH_2CH_2CH_2NHMe$ | Me | 2-Me | H | H | Cl | H | 0 | H |

The following example is illustrative of the preparation of the compounds of the claims. Other compounds of the invention may be prepared by the method described below or by other methods such as the method disclosed in application Ser. No. 517,995, now Pat. 3,360,518.

PREPARATION OF 7-CHLORO-1-(β-DIMETHYL-AMINOETHYL)-2-METHYL - 6 - SULFAMYL-3-(O-TOLYL) - 1,2,3,4 - TETRAHYDRO-4-QUINAZOLINONE

Synthetic scheme

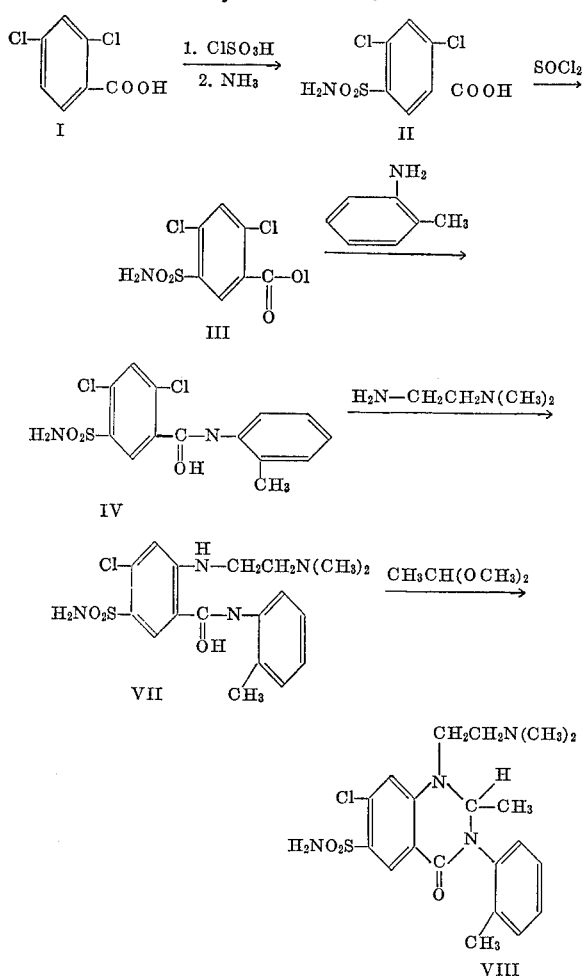

PREPARATION OF 4-CHLORO-2-(β-DIMETHYL-AMINOETHYL) - 5 - SULFAMYL-N-(O-TOLYL)-BENZAMIDE (VII)

2,4-dichloro-5-sulfamyl - N - (o-tolyl)benzamide (prepared as in Example I above) (10 gm.) was added to 20 gm. β-dimethylaminoethyl amine. The mixture was refluxed for 1 hour and poured into 600 cc. water. The solid was recrystallized from 100 ml. 50% aqueous alcohol to give 9.5 gm. product, M.P. 80–5° C.

PREPARATION OF 7-CHLORO-1-(β-DIMETHYL-AMINOETHYL)-2-METHYL - 6 - SULFAMYL-3-(O-TOLYL)-1,2,3,4-TETRAHYDRO - 4 - QUINAZOLINONE (VIII)

4-chloro-2-(β-dimethylaminoethyl) - 5 - sulfamyl-N-(o-tolyl)-benzamide (V) (10 gm.) was added to 80 ml. acetic acid and 8 gm. 1,1-dimethoxyethane. The resultant mixture was warmed to 80° C., then 5.5 ml. sulfuric acid added. The solution was stirred at 80° C. for ~10 minutes then poured into 300 ml. water. The clear filtrate was brought to pH 8. The solid was filtered off and recrystallized from 100 ml. 95% ethanol to give 5.4 gm., M.P. 99–100° C.

The other compounds of this invention can be made by modification of ingredients and quantities of the above example as is well understood by those skilled in the art.

From pharmacology tests run on 7-chloro-1-(β-dimethylaminoethyl)-2-methyl - 6 - sulfamyl-3-(o-tolyl)-1,2,3,4-tetrahydro-4-quinazolinone (compound N) and other indications and analogy, the compounds of this invention are effective diuretics, saluretics, and antihypertensives with low toxicity. For example, the following is a summary of the pharmacology on compound N:

SUMMARY (a) Symptomatology and acute $LD_{50}$ in mice

Orally.—$LD_{50} > 1000$ mg./kg. (48 hours) no symptoms at 1000 mg./kg.

Interperitoneal.—$LD_{50} > 316$ mg./kg. (48 hours) some hypothermia and decreased spontaneous motor activity at 1000 mg./kg.

(b) Cardiovascular in dog

Doses intravenously up to 10 mg./kg. were administered. There were no changes in the cardiovascular system.

(c) Diuretic assay in rats

When administered by the oral route in initial assays measuring output of urine (ml./kg.), $Na^+$, and $Cl^-$ (meq./kg.) at 4 hours and 21 hours after drug administration, Compound N was found to promote water and salt loss, has a rapid onset and prolonged action, and appears to have a potency greater than that of quinethazone.

The compound is an effective and safe diuretic when administered in the same manner as quinethazone and in the same or smaller dosage unit amounts.

In the preceding specification the temperatures, wherever given, are in degrees centigrade.

Various modifications of the structural formula on page 1 of the specification may be made, such as, for example, has been done for other tetrahydro-7-halo-6-sulfamyl-4-quinazolinones known to the art, without departing from the spirit of the invention which is concerned particularly with the aryl and alkaryl group on the 3-position and an amino alkyl in the 1-position. $R_2$, for example, may be alkenyl such as allyl, butenyl, and the like; also alkoxy such as methoxy, ethoxy, and the like; and aryl such as phenyl or naphthyl; and substituted aryl substituted as shown for the substituted aralkyl.

It will also be understood that any of the groups of $R_2$ may be substituted for the 2 hydrogen of the heterocycle.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:

1. A compound of the formula:

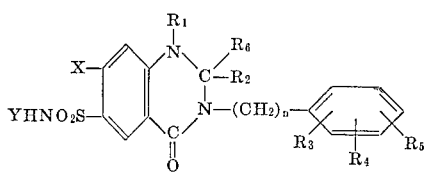

or the pharmaceutically acceptable salts thereof, in which X is halogen or trifluoromethyl; Y is hydrogen or loweralkyl; $R_1$ is aminoloweralkyl, loweralkylaminoloweralkyl, dialkylaminoloweralkyl, or hydroxyloweralkyl; $R_2$ is hydrogen, loweralkyl, loweralkoxy, loweralkoxyalkyl, loweralkenyl, loweralkynyl, lowercycloalkyl, lowercycloalkyl-loweralkyl, thioloweralkyl, halogen substituted loweralkyl, phenylloweralkyl, or substituted phenylloweralkyl or phenyl in which the phenyl substituent is hydroxy, loweralkoxy, loweralkyl, halogen, trifluoromethyl, sulfamyl or amino; $R_3$ is hydrogen, loweralkyl, hydroxy, loweralkoxy, $NH_2$, sulfamyl, halogen, or trifluoromethyl; $R_4$ and $R_5$ are any of the members of $R_3$; $R_6$ is any of $R_2$, and $n$ is an integer from 0–4.

2. The compound of claim 1 wherein X is chlorine, Y is hydrogen, $R_1$ is aminomethyl, $R_2$ is methyl, $R_3$ is ortho-methyl; $R_4$, $R_5$ and $R_6$ are hydrogen, and $n$ is 0.

3. The compound of claim 1 wherein X is chlorine, Y is hydrogen, $R_1$ is aminomethyl, $R_2$ is hydrogen, $R_3$ is orthomethyl; $R_4$, $R_5$, and $R_6$ are hydrogen, and $n$ is 0.

4. The compound of claim 1 wherein X is chlorine, Y is hydrogen, $R_1$ is aminomethyl, $R_2$ is chloromethyl, $R_3$ is ortho-methyl; $R_4$, $R_5$, and $R_6$ are hydrogen, and $n$ is 0.

5. The compound of claim 1 wherein X is chlorine, Y is hydrogen, $R_1$ is hydroxyethyl, $R_2$ is methyl, $R_3$ is orthomethyl; $R_4$, $R_5$, and $R_6$ are hydrogen, and $n$ is 0.

6. The compound of claim 1 wherein X is trifluoromethyl, Y is hydrogen, $R_1$ is aminomethyl, $R_2$ is methyl, $R_3$ is ortho-methyl; $R_4$, $R_5$, and $R_6$ are hydrogen, and $n$ is 0.

7. The compound according to claim 1 wherein the pharmaceutically acceptable salt is an alkali metal salt.

8. The compound of claim 1 wherein the compound is 1-aminoethyl - 2 - (2,2-dimethyl)-3-o-tolyl - 6 - sulfamyl-7-chloro1,2,3,4-tetrahydro-4-quinazolinone.

9. The compound of claim 1 wherein the compound is 1-hydroxyethyl - 2 - methyl-3-o-tolyl-6-sulfamyl-7-chloro-1,2,3,4-tetrahydro-4-quinazolinone.

10. The compound of claim 1 which is 7-chloro-1-($\beta$-dimethylaminoethyl) - 2 - methyl-6-sulfamyl-3-(o-tolyl)-1,2,3,4-tetrahydro-4-quinazolinone.

11. The compound of claim 1 wherein $R_1$ is aminoloweralkyl, loweralkylaminoloweralkyl, dialkylaminoloweralkyl; and the members in the other positions are the same as in claim 1.

References Cited
UNITED STATES PATENTS 3,360,518  12/1967  Shetty _____ 260—256.5

ALEX MAZEL, Primary Examiner

R. J. GALLAGHER, Assistant Examiner

U.S. Cl. X.R.

260—518, 544, 556; 424—251